US012375865B2

(12) United States Patent
Walther et al.

(10) Patent No.: US 12,375,865 B2
(45) Date of Patent: Jul. 29, 2025

(54) SOUND REPRODUCTION/SIMULATION SYSTEM AND METHOD FOR SIMULATING A SOUND REPRODUCTION

(71) Applicant: Fraunhofer-Gesellschaft zur Förderung der angewandten Forschung e.V., Munich (DE)

(72) Inventors: Andreas Walther, Erlangen (DE); Harald Fuchs, Erlangen (DE); Marc Gayer, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/344,465

(22) Filed: Jun. 10, 2021

(65) Prior Publication Data

US 2021/0306786 A1 Sep. 30, 2021

Related U.S. Application Data

(63) Continuation of application No. PCT/EP2019/086467, filed on Dec. 19, 2019.

(30) Foreign Application Priority Data

Dec. 21, 2018 (EP) .................................... 18215687
Apr. 2, 2019 (EP) .................................... 19166875

(51) Int. Cl.
*H04S 7/00* (2006.01)
*H04R 3/12* (2006.01)

(52) U.S. Cl.
CPC ................ *H04S 7/30* (2013.01); *H04R 3/12* (2013.01)

(58) Field of Classification Search
CPC combination set(s) only.
See application file for complete search history.

(56) References Cited

U.S. PATENT DOCUMENTS 7,783,054 B2 8/2010 Ringlstetter et al.
8,419,841 B2 4/2013 Tanaka et al.
(Continued)

FOREIGN PATENT DOCUMENTS

CN 102104816 A 6/2011
CN 104956689 A 9/2015
(Continued)

OTHER PUBLICATIONS

Harman International Company, "2112 Studio Guitar System", Dec. 15, 1996 (Dec. 15, 1996), pp. 1-92, XP055788533, Retrieved from the Internet: URL:https://www.manualslib.com/download/380722/Digitech-2112.html [retrieved on Mar. 22, 2021].
(Continued)

*Primary Examiner* — Duc Nguyen
*Assistant Examiner* — Assad Mohammed
(74) *Attorney, Agent, or Firm* — NKL LAW; Jae Youn Kim

(57) ABSTRACT

A sound reproduction/simulation system includes at least sound reproduction device driven by one or more audio signals and a processor for processing an input audio stream to generate the one or more audio signals. The processor performs processing based on processing parameters defined by a sound characteristic of a target system.

18 Claims, 4 Drawing Sheets

(56) References Cited

U.S. PATENT DOCUMENTS

| | | | | |
|---|---|---|---|---|
| 9,426,575 | B2 * | 8/2016 | Kim | H04S 7/302 |
| 9,743,201 | B1 | 8/2017 | Button et al. | |
| 9,769,585 | B1 * | 9/2017 | Hills | H04S 5/00 |
| 9,843,881 | B1 * | 12/2017 | Oates, III | H04R 5/02 |
| 2001/0038702 | A1 | 11/2001 | Lavoie et al. | |
| 2003/0215097 | A1 | 11/2003 | Crutchfield | |
| 2006/0133628 | A1 * | 6/2006 | Trivi | G10H 1/0066 381/310 |
| 2007/0165878 | A1 * | 7/2007 | Konagai | H04R 1/403 381/89 |
| 2010/0284549 | A1 | 11/2010 | Oh et al. | |
| 2011/0150241 | A1 | 6/2011 | Christoph et al. | |
| 2011/0160882 | A1 | 6/2011 | Gupta et al. | |
| 2011/0200195 | A1 | 8/2011 | Lau et al. | |
| 2012/0328109 | A1 | 12/2012 | De Bruijn et al. | |
| 2014/0153727 | A1 | 6/2014 | Kelly et al. | |
| 2014/0288940 | A1 | 9/2014 | Grant et al. | |
| 2015/0063578 | A1 | 3/2015 | Daly | |
| 2015/0153999 | A1 | 6/2015 | Brodkin | |
| 2015/0193196 | A1 * | 7/2015 | Lin | G06F 3/165 715/716 |
| 2015/0289071 | A1 | 10/2015 | Knickrehm et al. | |
| 2015/0334505 | A1 | 11/2015 | Crutchfield et al. | |
| 2015/0350805 | A1 | 12/2015 | Christoph | |
| 2016/0203811 | A1 * | 7/2016 | Brockmole | H04S 7/30 381/94.5 |
| 2016/0261954 | A1 | 9/2016 | Jean-Loup et al. | |
| 2017/0060526 | A1 * | 3/2017 | Barton | G06F 3/165 |
| 2017/0127211 | A1 * | 5/2017 | Crockett | H04R 1/26 |
| 2017/0142536 | A1 | 5/2017 | Hattori et al. | |
| 2017/0188088 | A1 * | 6/2017 | Hammer | H04N 21/42684 |
| 2017/0339505 | A1 | 11/2017 | Purnhagen et al. | |
| 2018/0077511 | A1 | 3/2018 | Mehta et al. | |
| 2018/0098172 | A1 * | 4/2018 | Family | H04R 5/02 |
| 2018/0109837 | A1 * | 4/2018 | Sprenger | H04N 21/47202 |
| 2018/0210695 | A1 | 7/2018 | Tsingos et al. | |
| 2018/0242077 | A1 * | 8/2018 | Smithers | H04R 1/345 |
| 2018/0285358 | A1 * | 10/2018 | Fogelson | G06F 16/437 |
| 2018/0324541 | A1 * | 11/2018 | Pang | H04S 1/005 |
| 2018/0359596 | A1 | 12/2018 | Breebaart et al. | |
| 2019/0075418 | A1 * | 3/2019 | Shi | H04S 7/303 |
| 2019/0116445 | A1 * | 4/2019 | Gerrard | H04S 7/303 |
| 2019/0297447 | A1 * | 9/2019 | Seldess | H04S 7/303 |
| 2020/0008002 | A1 * | 1/2020 | Sahay | G06F 18/217 |

FOREIGN PATENT DOCUMENTS

| | | | |
|---|---|---|---|
| CN | 104980845 | A | 10/2015 |
| CN | 106465031 | A | 2/2017 |
| EP | 1183911 | B1 | 3/2002 |
| EP | 3720143 | A1 | 10/2020 |
| GB | 2550877 | A | 12/2017 |
| JP | H06289882 | A | 10/1994 |
| JP | 2000-217186 | A | 8/2000 |
| JP | 5056499 | A | 10/2012 |
| JP | 2013-519253 | A | 5/2013 |
| WO | 2011095913 | A1 | 8/2011 |
| WO | 2014/085510 | A1 | 6/2014 |
| WO | 2016/153825 | A1 | 9/2016 |
| WO | 2017/021162 | A1 | 2/2017 |
| WO | 2018/026799 | A1 | 2/2018 |
| WO | 2018/202324 | A1 | 11/2018 |

OTHER PUBLICATIONS

Markov M.V., “Office Action for RU Application No. 2021120065/28(042141)”, Feb. 17, 2022, Russia.

Go Oishi, “Office Action for JP Application No. 2021-535812”, Aug. 30, 2022, JPO, Japan.

Zhiqing Chen, “Office Action for CN Application No. 201980085181.3”, Jul. 4, 2022, CNIPA, China.

BluGuitar GmbH, Blubox VSC Speaker Emulator, manual, pp. 1-11, XP55788541, 2018.

* cited by examiner

SOUND REPRODUCTION/SIMULATION SYSTEM AND METHOD FOR SIMULATING A SOUND REPRODUCTION

CROSS-REFERENCES TO RELATED APPLICATIONS

This application is a continuation of copending International Application No. PCT/EP2019/086467, filed Dec. 19, 2019, which is incorporated herein by reference in its entirety, and additionally claims priority from European Applications Nos. EP 18 215 687.7, filed Dec. 21, 2018, and EP 19 166 875.5, filed Apr. 2, 2019, all of which are incorporated herein by reference in their entirety.

BACKGROUND OF THE INVENTION

Embodiments of the present invention refer to a sound reproduction/simulation system and to a method for simulating a sound reproduction. Further embodiments provide a generic audio reproduction device, e.g. for multi-channel sound reproduction.

For multi-channel sound, usually a number of individual loudspeakers are installed not only in the frontal area of a listening environment, but additionally on the sides and rear. Besides horizontal only loudspeaker arrangements, also setups with elevated loudspeakers are in use. Such reproduction systems enable spatial and immersive sound reproduction.

An alternative to such loudspeaker setups are soundbars. Soundbars usually host a number of drivers (i.e. 'single loudspeakers membranes') in a single enclosure. Some are specifically intended to be mounted below or above a display. Most soundbars are offered with (wireless) subwoofers today, while there are also variants that do not need external subwoofers.

Similar devices termed e.g. soundplate, soundbase or the like have enclosures that are usually deeper than that of a soundbar, such that e.g. a television set could be directly placed on top of them.

Currently, soundbars are mostly used in consumer audio playback. A soundbar is an audio reproduction device that usually combines in one enclosure all the connectivity/connectors, amplifiers, processing, loudspeakers etc. that are needed for audio reproduction. Many variants of soundbars exist on the market and soundbars are available in different price ranges, with different features, and in different quality levels. The differences can e.g. be in the size and shape of the enclosure, the number and/or size and/or quality and/or position and/or arrangement of the used loudspeaker driver, the kind of processing that is applied to the input signals. Some soundbars act simply as multiple loudspeakers put into a unified single enclosure (with no advanced signal processing besides the amplification). Others apply processing of different degrees of sophistication to achieve a convincing (spatial) audio playback from a single device.

Some soundbars do not consider the specific geometry and acoustic properties of the playback room they are used in, more sophisticated ones do that (e.g. by using a calibration based on a measurement signal or by user adjustment). Some soundbar devices use microphone(s) for calibration to e.g. adapt the processing to match the actual playback room and/or listener position.

The same concepts as described in the following can also be applied e.g. to 3D soundbars, to loudspeakers frames (that are arranged e.g. surrounding a display), to cylindrical arrays of loudspeakers, spherical arrays of loudspeakers, and to boom-boxes, dockingstation-like, or smartspeaker reproduction devices.

Since soundbars are a very popular playback device in consumer homes, professionals and content producers would also like to monitor their productions (e.g. directly during production/in the creation process) on such devices.

This poses several problems, since the outcome heavily depends on e.g. the quality of the target device and the processing that is applied by a specific soundbar. This variability makes it hard to decide on a single soundbar to monitor on. Selecting a whole bunch of soundbar products is also not a convenient solution. Furthermore, it is not easy to seamlessly connect consumer devices into professional environments. Most consumer devices only feature consumer connectivity/connectors (e.g. HDMI), while in production environments, professional connectors are used (e.g. MADI). Furthermore, most consumer device expect the content packed or coded in (consumer) formats (e.g. MP3, AAC, etc . . . ), while in professional environments, uncompressed audio is used most of the time. An important issue in that regard is also the realtime capability of the system to enable realtime monitoring on such a device. For production purposes e.g. realtime can mean that the introduced delay has to be at least short enough so that any change applied to the content during a production step can be perceptually seamlessly monitored on the audio reproduction device. Therefore, there is the need for an improved approach.

SUMMARY

According to an embodiment, a sound reproduction/simulation system may have: at least one sound reproduction device driven by one or more audio signals; and a processor for processing an input audio stream to generate the one or more audio signals; wherein the processor performs the processing based on processing parameters defining a characteristic of a target system.

Another embodiment may have an apparatus for determining one or more processing parameters comprising an analyzer configured to analyze a target system in order to acquire one or more processing parameters, wherein the analysis is performed with respect to at least two properties.

According to another embodiment, a method for simulating a performance of a target system may have the steps of: processing an input audio stream to generate one or more audio signals, wherein the processing is performed based on processing parameters defining a sound characteristic of the target system; and outputting the one or more audio signals in order to drive at least one sound reproduction device.

According to another embodiment, a method for determining one or more processing parameters may have the steps of: analyzing a target system in order to acquire one or more processing parameters, wherein the analysis is performed with respect to at least two dimensions.

Another embodiment may have a non-transitory digital storage medium having a computer program stored thereon to perform the method for simulating a performance of a target system, the method having the steps of: processing an input audio stream to generate one or more audio signals, wherein the processing is performed based on processing parameters defining a sound characteristic of the target system; and outputting the one or more audio signals in order to drive at least one sound reproduction device, when said computer program is run by a computer.

Another embodiment may have a non-transitory digital storage medium having a computer program stored thereon to perform the method for determining one or more processing parameters, the method having the steps of: analyzing a target system in order to acquire one or more processing parameters, wherein the analysis is performed with respect to at least two dimensions, when said computer program is run by a computer.

According to another embodiment, a sound reproduction/simulation system may have: at least one sound reproduction device driven by one or more audio signals; and a processor for processing an input audio stream to generate the one or more audio signals; wherein the processor performs the processing by use of processing parameters defining a sound characteristic of a target sound system out of at least two different target sound systems, wherein said processing parameters are configured to enable to mimic and/or simulate the target sound system by use of the sound reproduction device; wherein the sound reproduction/simulation system comprises a memory having stored thereon a database or is connected to a database storing the processing parameters for the at least two different target sound systems, wherein the target sound system comprises a soundbar configured to reproduce surround, 3D content and/or immersive content; wherein a processing parameter of the processing parameters describes the directivity of a sound reproduced by the target sound system.

An embodiment provides a sound reproduction system, comprising at least one sound reproduction device, like a soundbar and a processor. The sound reproduction device is driven by one or more audio signals (e.g. 2 channel stereo or 5.1 or 5.1+4H). The processor is configured to process an input audio stream to generate the one or more audio signals. Here, it performs the processing based on processing parameters defining a sound characteristic of a target system.

Embodiments of the present invention are based on the finding, that by use of a high-quality audio reproduction device, e.g. a soundbar having high-quality components and digital signal processing, it is possible to mimic/simulate what other soundbar systems/target systems would do. The combination of a high-quality sound reproduction device with a processing using processing parameters defining a sound characteristic of a target system form an audio reproduction system which is characterized by its ability to simulate a number of other/similar/related/complementary audio reproduction systems, also referred to as target system, e.g. of different size, different quality, or featuring a different kind of underlying processing. The processing parameters are adjustable parameters used to adapt the sound reproduction/simulation system to the target system, e.g. a consumer reproduction system/consumer soundbar. As result such a high-end generic soundbar enables the user to simulate different soundbar devices from just a single device. This helps in monitoring the expected consumer device performance during production. The so defined system can, for example, find application in the professional production environments where a content producer desires to monitor during production (in real time) how a customer/consumer will likely hear the produced content.

According to embodiments, the sound reproduction system/monitoring system is a soundbar, for example, comprising two or more transducers. This gives the sound reproduction device the ability to produce one or two or more channels. Analogously, the target device may also be a soundbar. The sound characteristic of the target device may be described by processing parameters. For example, one of the processing parameters describes a transducer configuration of the target system. Here, an information regarding a number of separate channels and/or regarding a number of the transducers per channel may be included in the transducer configuration information. Furthermore, if for example beamforming is used, the processing parameter describing the transducer configuration may comprise a number of transducers used for the different channels. In general, this processing parameter may describe a number of the transducers of the target system. In case the number of the transducers of the target system is known, the processor can use this processing parameter to define a number of transducers of the sound reproduction/simulation system to be used. In detail, the transducers of the sound reproduction/simulation system may be selected based on this information, so that there is a direct dependency between the selection and the respective processing parameter.

The processing parameters enable the modification of a sound reproduction with regard to different "dimensions". A small, but not necessarily complete overview over the properties/dimensions will be given below:

A first property/dimension may refer to the reproduction capabilities of the target device mainly influenced by the hardware. For example, the hardware of the target device has a specific transmission characteristic with regard to the frequency response. Thus, one of the processing parameter describes the hardware characteristic.

Another processing parameter describes the performed coding/encoding of the target device. Background thereof is that some target devices perform during the reproduction a specific decoding having an influence on the sound behavior. This coding dimension may be represented by at least one processing parameter.

A third property/dimension refers to the operation mode, i.e., to the question, whether beamforming, dipoling or conventional playback is reproduced by the target device.

A fourth property/reproduction dimension refers to the question, whether the target system performs an upmix or downmixing.

Another property/reproduction dimension refers to the loudspeaker arrangement. This processing parameter describes the different positions of the signal transducers of the target system or the size of the enclosures of the target system.

Note that there may be a plurality of other dimensions, wherein at least one, but advantageously a plurality of these dimensions describe the entire transmission behavior of a target system, so that the above described sound reproduction system/monitoring system is enabled by use of the processing parameter including an information on the different dimension to reproduce sound comparable to the sound reproduction which would be performed by the target system. Expressed in other words, this means that the processing processes the audio stream ST with respect to one or advantageously more of the above dimensions, each described by one or more processing parameters.

According to further embodiments, the processing parameter may describe a transducer frequency response, a transducer impulse response, a transducer phase response, a transducer impedance of the one or more transducers of the target system. This transducer frequency response/transducer impulse response/transducer phase response/transducer impedance is used to process or filter the audio signals before outputting same by the above described processor. Another processing parameter may describe an enclosure performance, e.g. whether it is an open (e.g. vented, ported, . . . ) or closed enclosure or an enclosure equipped with passive radiators.

According to a further embodiment, one of the processing parameters may describe a digital processing performed by the target system or the used encoding format. Besides playback from disc based formats (e.g. CD, Blu-ray) consumer sound reproduction devices (the target system) are typically used to playback content that is received through broadcast or streaming. For the delivery of such content specific encoding formats are used. If the encoding format is known, the processing can be performed by the processor of the above described sound reproduction/simulation system to simulate/emulate the behavior of the target system playing back encoded content.

According to a further embodiment, one of the processing parameters may describe an operation mode (e.g. beam forming, direct free channel audio, dipole processing, cross-talk cancelation, HRTF filtering, etc.). Based on this processing parameter, the sound reproduction/simulation system can determine its processing.

According to a further embodiment, one or more of the processing parameters may describe additional sound enhancement features (e.g. multichannel upmixing, bass enhancement, dynamic processing, etc.) Based on this processing parameters, the sound reproduction/simulation system can determine its processing to simulate the various enhancement and audio processing steps that can be found in (consumer) playback systems that constitute the target devices.

According to a further embodiment, all of the processing parameters, which define, how the sound behavior of a target system can be simulated/emulated, can be stored within a database (contained in a memory). This database can be an external database or a database belonging to the processor or a database connected to the processor. This database and the processor might also be designed in a way so that it may be updated later to enable the emulation of further target systems.

Another embodiment provides a method for simulating a performance of a target system. This method comprises the two basic steps of processing an input audio stream to generate one or more audio signals, wherein the processing is performed based on processing parameters defining a sound characteristic of the target system; and outputting the one or more audio signals in order to drive at least one sound reproduction device.

Another embodiment provides a method for analyzing a target system in order to obtain the processing parameters. Here, the method may comprise the step of analyzing the target system by use of test tones.

According to further embodiments, this method or parts of the method may be executed by use of a computer. Thus, an embodiment refers to a computer program.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
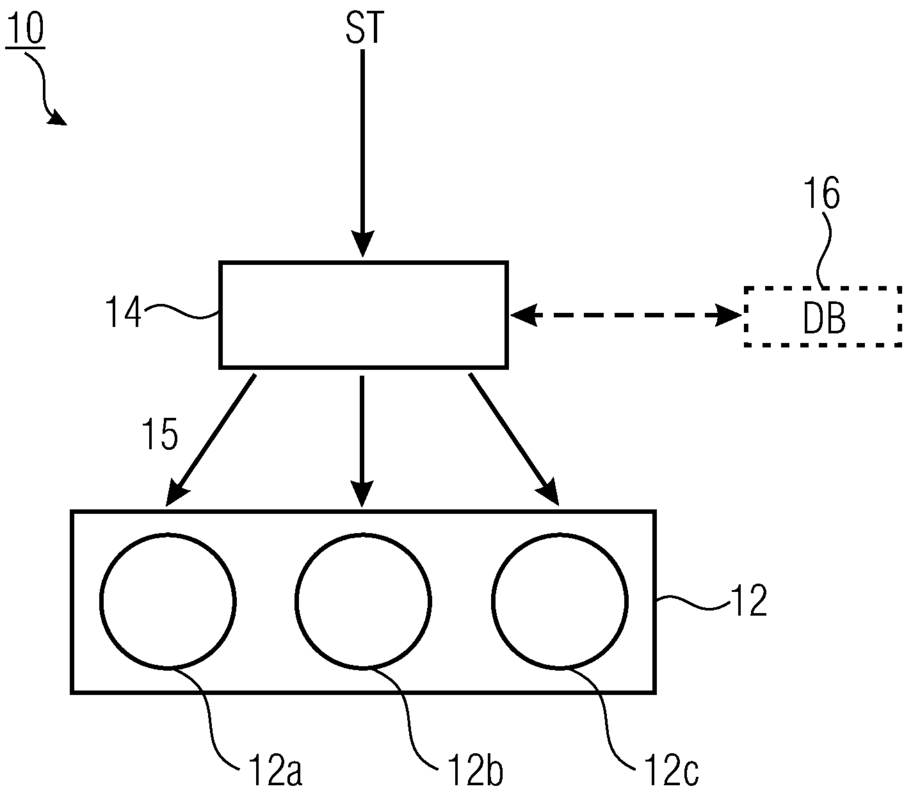
FIG. 1 shows a schematic representation of a sound reproduction/simulation system according to a basic embodiment.

Below embodiments of the present invention will be discussed referring to the enclosed Figures. Here, identical reference numerals are provided to objects having identical or similar function, so that the description thereof is mutually applicable and interchangeable.

FIG. 1 shows a sound reproduction/simulation system 10 comprising at least one sound reproduction device 12 controlled using a processor 14. The processor may comprise or may be connected or may have access to an optional database 16.

The sound reproduction device 12 may, for example, be a soundbar, advantageously high-quality soundbar. The soundbar can, for example, have a plurality of transducers 12*a* to 12*c* (e.g. similar/equal or different transducers, i.e. transducers of same or different type and/or model) which can, for example, be selectively controlled, such that a plurality of channels, e.g. two channels or three channels can be reproduced by the soundbar 12. The transducers 12*a*, 12*b*, and 12*c* have a (nearly) ideal frequency response or, in general an identical behavior (e.g. regarding their frequency response, phase response, etc . . . ). Here, it should be noted that each of the transducers 12*a* to 12*c* may be realized by a single membrane transducer or may be realized as a transducer system, e.g. a coaxial transducer system or another two way transducer system or transducer system having a plurality of respective transducers for respective frequency ranges. The transducers 12*a*, 12*b*, and 12*c* are feed with one or more audio signals AS. Advantageously, each transducer or transducer combination is controlled by an own audio signal AS output by the processor 14.

This high-quality soundbar enables to reproduce one or more audio signals in an optimal manner, so that even sound characteristics included in the audio signals AS can be reproduced.

These sound characteristics e.g. specific sound coloration are imprinted on the audio signals AS by the processor 14. The reproduction characteristics can, for example, be an imprinted frequency-response characteristic generated by the processor, e.g. by equalizing the audio signals AS such that a specific frequency portion is amplified or attenuated. Alternatively, the reproduction characteristics can result in a specific impulse response, i.e. impulse response causing harmonic distortions, or in a specific phase response. A further example for a sound characteristic is a number of parallel (independent) channels. Background thereof is, that it is a characteristic for a sound system how may channels can be reproduced. The number of reproduced channels has a significant influence on a spatial effect generated by the sound reproduction. This spatial effect may also be a specific sound characteristic. For example, the spatial effect may be in direct dependency to a so-called operation mode. On the market, there are different operation modes, like di-poling or the use of psycho-acoustic effects to create virtual surround, beamforming sound signals to direct surround signals into certain directions, or simple two channel stereo.

It should be noted that channel refers to the independent reproduction elements, e.g., output by a loudspeaker into a certain direction. Each channel can have its own content. For example, a stereo typically has two channels, where the content of the left channel differs from the content of the right channel. A 5.1 reproduction has typically 5+1 channels. The number of channels is dependent on the number of source channels and the facility of the loudspeaker system to reproduce different channels in parallel. The number of channels may be changed due to the processing by use of an upmixing or downmixing. For example, a downmixing enables to reproduce a 5.1 representation by use of two transducers, wherein two channels are generated by the two transducers. Vice versa, a stereo signal may be upmixed to a soundbar configured for performing 5.1-reproduction. Here, the upmixing may be performed with or without enhancing the information of the stereo signal.

According to a further embodiment, the processor features upmix means, by which multi-channel signals can be generates from signals having at least one input channel, but less channels than the desired multi-channel output.

According to a further embodiment, the processor features downmix means, by which input multi-channel signals can be processed to result in output signals that have less channels than the input signals.

As described above, consumer sound reproduction devices like conventional soundbars often modify a sound reproduction due to their sound characteristic. Expressed from another point of view, this means that when impressing (in sense of modeling or mimicking) a specific sound characteristic (of a specific target system), it is possible to simulate the sound reproduction of the target system. This finding is used by the processor 14 which processes the audio stream ST by imprinting a sound characteristic of a target system to the audio signals. This has the purpose to simulate the sound reproduction of a target system, such that it can be determined in real time how the sound would be reproduced on another sound system/another soundbar.

Regarding the processing, it should be noted that all sound characteristics may be defined by processing parameters, e.g. filter parameters or e.g. a parameter defining a transducer configuration. Based on this processing parameters, the processor 14 processes the audio stream ST so as to generate the one or more audio signals AS driving the transducers 12*a* to 12*c*. According to further embodiments, the processing parameters are stored in an optional database 16 which is connected to the processor. This database 16 may store the processing parameters for a first target system and—according to further embodiments—for a second/further target system. As discussed above, the target systems may differ from each other with respect to the transducer frequency response, transducer impulse response, transducer phase response or with respect to its transducer configuration or with respect to another property.

Below, different sound characteristics and their influence will be discussed. A first factor of influence is, as already discussed, the type of transducers which have a characteristic with regard to their transducer frequency response, transducer impulse response or transducer phase response. For example, different transducers have different operating ranges regarding the frequency range they can be operated in, or regarding the sound pressure level they can produce. As further examples, some transducers may characteristically amplify certain frequency more than other frequencies. Alternatively or additionally, harmonic or inharmonic distortions may be generated within certain frequencies. For example, often the low frequency ranges are attenuated. Sometimes, mid frequencies can be amplified. Furthermore, the frequency band can be limited with regard to high frequency portions or low frequency portions, depending on the specific usecase and frequency band the drivers have been optimized for. Such a transmission characteristic can be actively generated, by equalizing or distorting an audio signal. Here, the information regarding the sound characteristic is stored as processing parameters, for example filter parameters. Starting from these processing parameters, the processor 14 processes the audio stream ST so as to output (equalize, distort, process) the audio signals AS. As a result, the performance of different loudspeaker types and target systems can be simulated by mimicking their performance (e.g. frequency response, phase response, spatialization, virtualization, rendering).

According to a further embodiment, the enclosure of the target sound device may have an influence to the sound reproduction. For example, the size of the enclosure often varies the impulse response and the radiation pattern. In order to map this influence, respective process parameters describing the enclosure properties or the acoustic effects introduced due to enclosure properties can be used. Here, these parameters may also describe an impulse response, so that the processor 14 can process the audio stream ST accordingly. As a result, the performance of different enclosures can be mimicked by digitally simulating the performance of those.

According to further embodiments, the processing parameters describing the transducer itself and the processing parameters describing the enclosure can be combined to a common processing parameter. For example, the properties of specific reference or consumer devices could be simulated based on measurements of the specific original devices. For such measurements to enable a processor to simulate the performance of a specific device, special test signals are used.

According to a further embodiment, the process parameters can describe a loudspeaker arrangement. Background thereof is that different audio reproduction devices are available. For example, there are devices having three independently controlled transducers so as to reproduce three independent (output) channels, where each channel is e.g. directly linked to and reproduced by a dedicated transducer, while other device reproduce the three (output) channels by use of just two transducers. Note, sometimes a plurality of transducers are uses instead of just one (driven by the same signal AS) in order to increase the sound pressure. Other devices can use two or more independently controlled transducers to perform beam forming, where for the reproduction of one of the (e.g. three) independent (output) channels, several or all of the available drivers may be/are used together, using e.g. array processing techniques. If, for example, two or three transducers are available, a plurality of beams, e.g. five beams for five channels can be generated. This setup can be stored as processing parameters, such that the processor 14 can process the audio stream ST accordingly so as to generate the audio signals AS. Alternatively or additionally, the information on the transducer configuration can comprise an information, whether per channel two or more transducers, e.g. transducers for reproducing different frequency ranges (mid-range speakers and tweeters) are used. In order to reproduce such configurations, the soundbar 12 may comprise a plurality of tweeters and a plurality of mid-range speakers, wherein each transducer is individually controllable. The processor can output for each transducer a respective audio signal AS. In such case, the assignment of a different channel to the different transducers as well as the active frequency band assignment can be performed by the processor. Expressed in other words, this means that the processor 14 is configured to actively filter the audio stream and to actively calculate the different channels so as to generate the plurality of audio signals AS for controlling the plurality of transducers 12*a* to 12*c*. This offers the possibility to simulate a soundbar with varying number of included drivers (e.g. in the high quality version with numerous loudspeakers, only two could be chosen to simulate a soundbar that only features two loudspeakers). The processing can be adapted accordingly and can, for example, include different downmix and upmix versions or rerouting matrices to adapt for the simulation of systems with more or less drivers. In such a high quality system, the properties of a consumer system of lower quality can be simulated (e.g. simulating the frequency response and/or the phase response and/or variability of those or different parameters). Further, the generic sound device can have a plurality of transducers configured for different frequency ranges (e.g. woofer, mid-range, tweeter). This enables the simulations of multiway systems (e.g. 2-way with dedicated tweeters and woofers) or systems that only use broadband drivers (i.e. without dedicated tweeters).

According to further embodiments, the processing parameters may define an encoding format by use of which the audio stream is en-/decoded. Background thereof is that it is quite common that sound reproduction devices like soundbars perform audio decoding which may have an influence on the reproduction performance. By applying such coding/encoding within the processor, the respective reproduction at the target system can be simulated.

According to a further embodiment, the processing parameters describe an operation mode, like dipoling, beamforming or conventional audio playback, especially, when the target device is configured to work by use of different operation modes. This offers the possibility to simulate different kinds of soundbar processing (e.g. plain one-to-one matching of input signals to output loudspeakers, HRTF or crosstalk-based virtualization methods, beamforming techniques, dipole systems, etc. and combinations thereof).

Below, with respect to FIGS. 2*a*, 2*b*, and 2*c*, three different target configurations together with the approach for simulating same will be discussed.

Figure 2A:
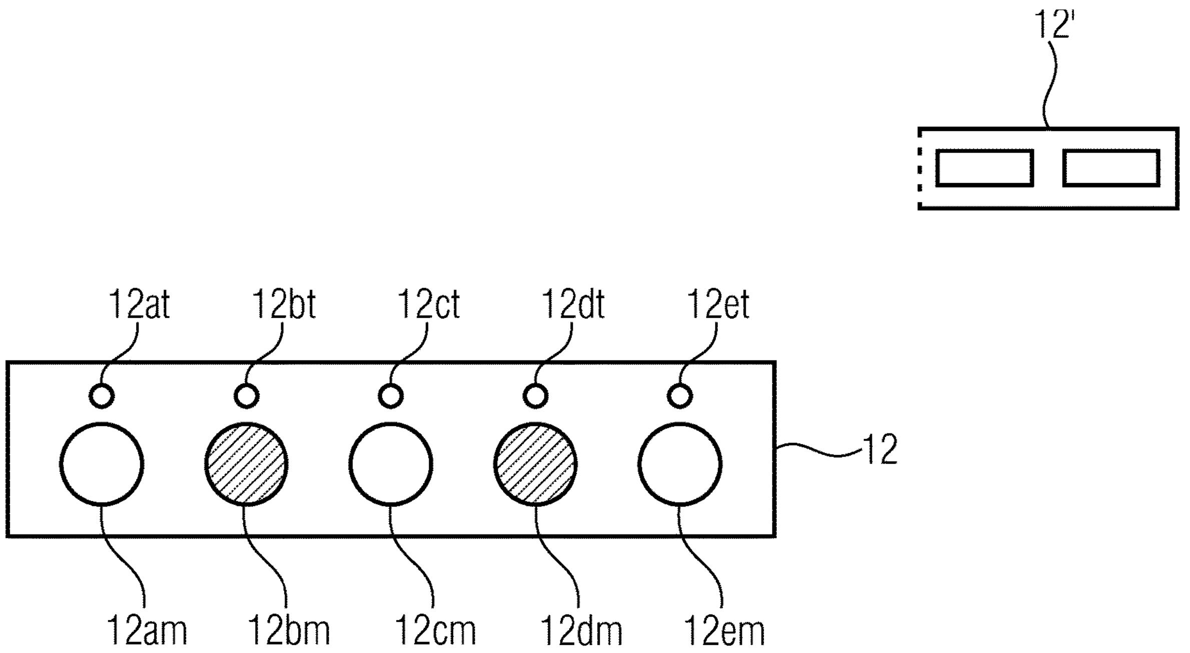
FIG. 2*a* to 2*c* show three exemplary target systems reproduced using the sound reproduction device belonging to the sound reproduction/simulation system according to an embodiment.

FIG. 2*a* shows a soundbar 12 having five mid-range speakers 12*am* to 12*em*, as well as the tweeters 12*at* to 12*et*. The mid-range speakers 12*am* to 12*em* are arranged along the soundbar 12, while the tweeters 12*at* to 12*et* are arranged adjacent to the respective mid-range speaker 12*am* to 12*em*. It should be noted that the number of transducers (mid-range speakers, tweeters) is not limited to the shown number, so can vary, and does not have to be the same for both transducer types. Furthermore, the soundbar 12 may also comprise one or more additional woofers and one or more internal or external subwoofers (not shown).

With the embodiment of FIG. 2*a*, the soundbar 12 is used to simulate a simple soundbar 12', shown in the corner. As can be seen, the soundbar 12' just comprises two transducers, namely so-called full-range loudspeakers. For simulating such a soundbar 12', the processing parameters characterize the soundbar 12' as having two channels, wherein each channel is formed by a single transducer for reproducing the entire frequency range. Such full-range speakers often have a limited reproduction quality for low and high frequencies. This information is stored using a processing parameter describing the frequency/reproduction characteristics.

The processor processes the described processing parameters and outputs audio signals to the transducer 12 such that, for example, the mid-range speakers 12*bm* and 12*dm* are used to reproduce sound in order to simulate the target device 12'. Here, the transducers 12*bm* and 12*dm* are controlled by respective audio signals comprising the entire frequency range and being output taking the respective frequency impulse response into account. Of course, the processor may use different transducers, e.g. the transducers 12*am* and 12*em* or a combination of a plurality of transducers, for example, 12*bm*+12*bt* and 12*dm*+12*dt*, or 12*am*+12*bm* and 12*dm* and 12*em*.

While most of the cheap soundbars available today are only capable of reproducing two channel stereo, more sophisticated products can also reproduce surround and 3D/immersive content. With respect to FIG. 2*b*, another configuration will be discussed.

Figure 2B:
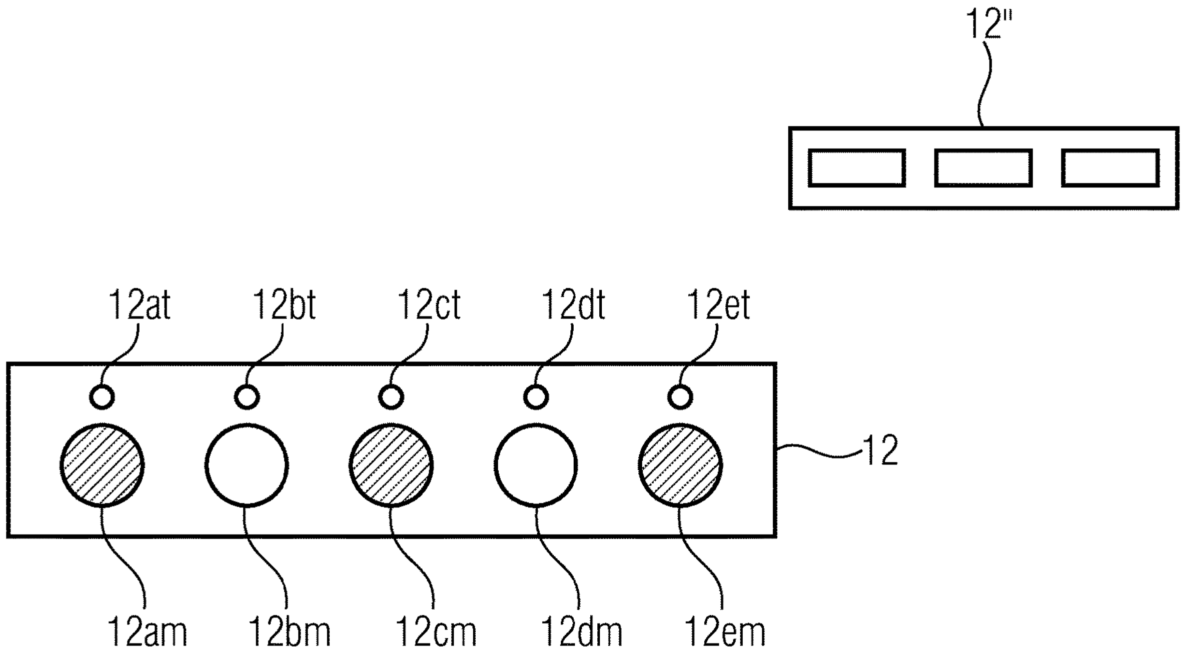

FIG. 2*b* shows the same soundbar 12, wherein here, a different target device 12" should be simulated. The target device 12" differs from the target device 12' in that way that the target device 12" uses three output channels. For example, the processor (not shown) controls the soundbar 12 such that same uses at least three transducers, for example, the transducers 12*am*, 12*cm* and 12*em*. Since the target device 12" is with regard to the type of transducers (and not with regard to the number) comparable to the target device 12', the transducers 12*am*, 12*cm*, 12*em* are used as full-range speakers having a transmission characteristics which is typical for such speakers. As discussed above, the full-range speakers may alternatively be emulated by a combination of a mid-range speaker and a tweeter, for example, 12*am*+12*at*.

Regarding the target device 12", it should be noted that this can be a target device reproducing three independent channels or, alternatively, e.g. a target device being configured for beam forming. Beam forming is a method that can be used in reproduction using transducer arrays to steer sound to specific directions. Here, using beam forming, the surround signals are directed to the side/rear, to be reflected from the surrounding walls. In this way, virtual surround with sound perceived from side/rear is reproduced without surround loudspeakers. The respective operation mode is used for controlling the reproduction device 12, accordingly. Just for the sake of completeness, it should be noted that another method for creating virtual surround is the use of psycho-acoustic effects. This method can be applied to two-channel soundbars (target device 12') or other soundbars, like the target device 12". Yet another class of devices uses dipole processing to generate the spatial effects. Here, dipoling may be used on the target device having at least two channels (cf. target device 12'). Of course, also combinations of those methods can be defined within an operation mode.

Figure 2C:
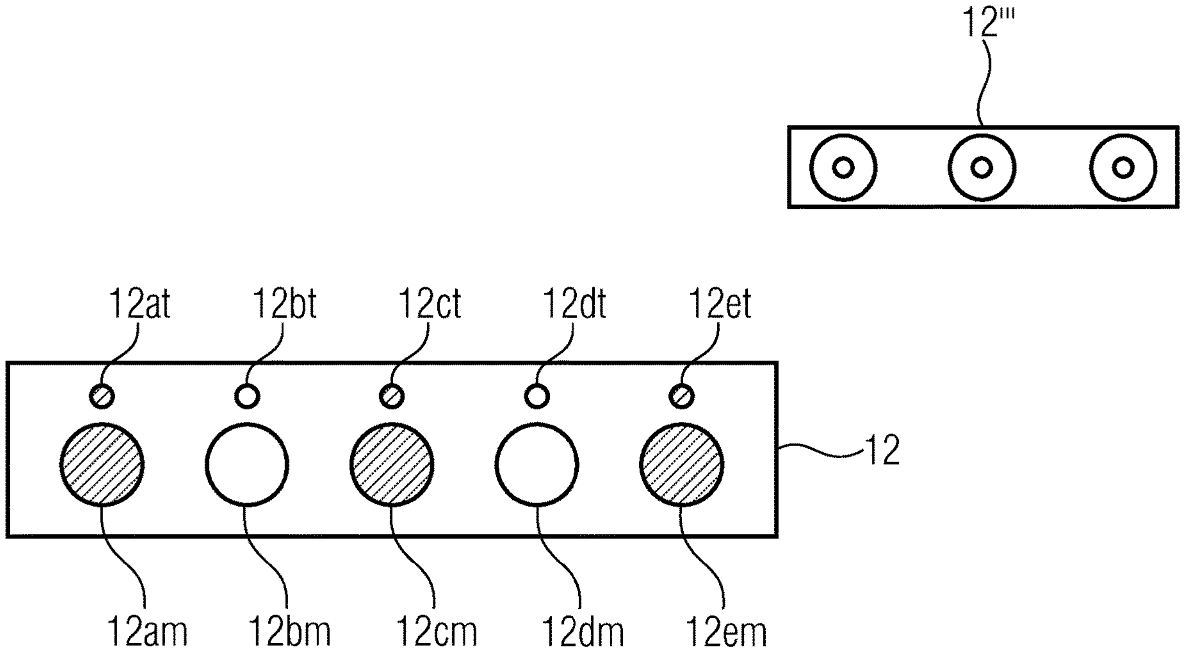

The target device 12'" as shown by FIG. 2*c* is comparable to target device 12", wherein here, coaxial speakers are used instead of the full-range speakers. In order to enable a good reproduction of this coaxial speakers, the processor controls a combination of a mid-range speaker and the tweeter for each coaxial speaker. Thus, the marked transducers 12*am*, 12*at*, 12*cm*, 12*ct*, 12*em*, and 12*et* are used for simulating the target device 12'". Here, not only the transducer configuration, but also the transmission characteristics are different, so other processing parameters are used when compared to the processing parameters used for simulating the target device 12". Of course it is also possible that the reproduction/simulation system devices according to the inventive method is equipped with coaxial speakers which can then be used to simulate other woofer/tweeter combinations, or fullrange drivers.

All process parameters for a respective target device 12', 12", 12'" can be stored in a database. Here, it should be noted that there can be different processing parameter sets enabling to reproduce one target device 12', 12" or 12'".

The usage of these processing parameters enables by use of the device 12 to mimic/simulate what other soundbar systems 12', 12" or 12'" (target systems) would do if they are used to reproduce an audio stream. This method for simulating a target device will be discussed with respect to FIG. 3.

Figure 3:
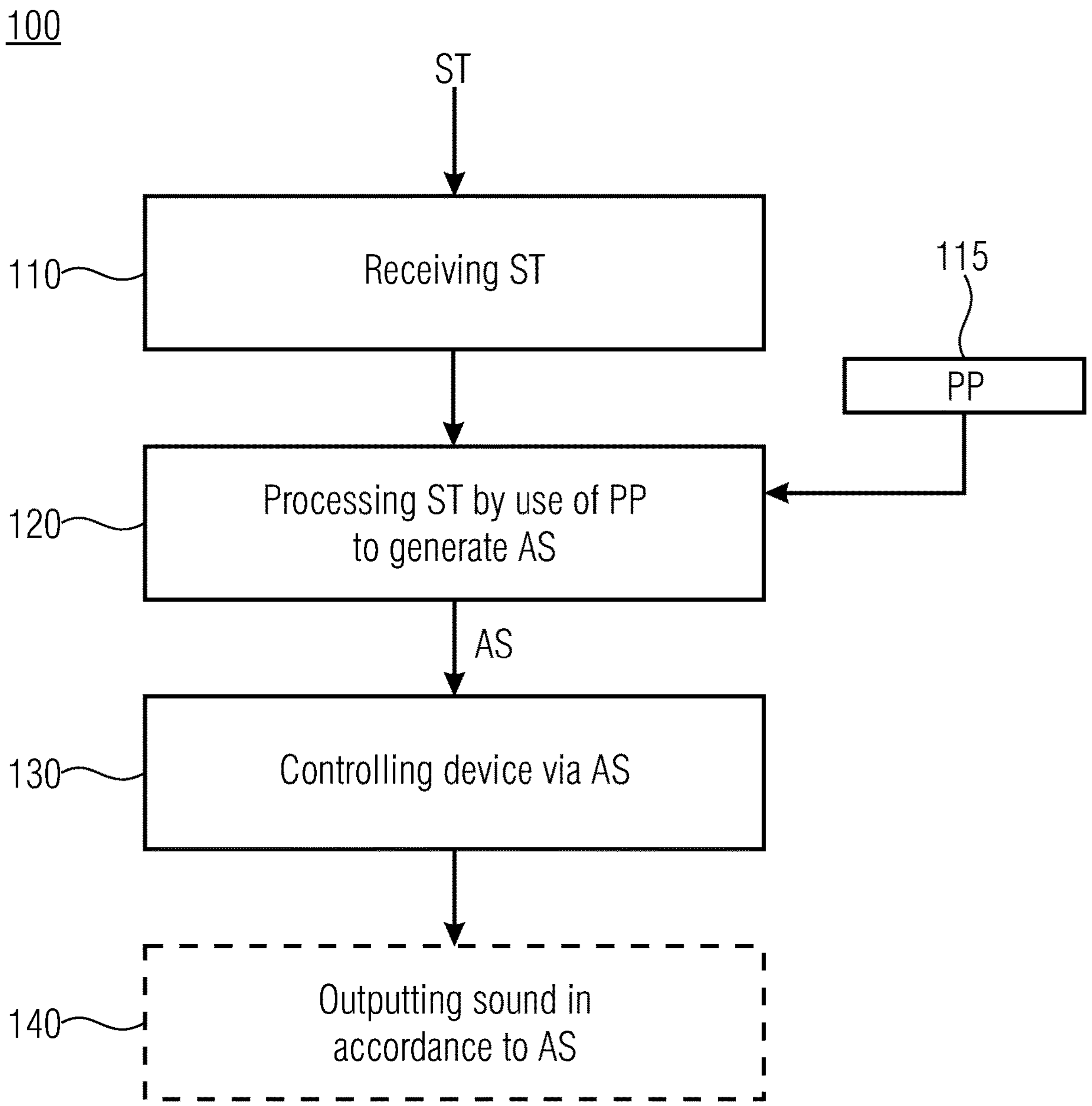
FIG. 3 shows a schematic flowchart illustrating a method for simulating a sound reproduction according to a further embodiment.

FIG. 3 shows a method 100 having the three basic steps 110, 120, and 130. Furthermore, the method 100 may comprise the optional steps 115 and 140.

Within the first basic step 110, the audio stream ST is received, e.g. from a source. The audio stream ST may be a single channel, or multi-channel source, like a 2 channel stereo signal, 5.1 surround signal, or a 3D/immersive audio signal with even higher channel number.

This audio stream ST is processed using the processing parameters PP in order to generate the audio signals AS (cf. step 120). Here, the processing parameters PP enable to model the sound characteristic of a target device to the audio signals AS, such that the used reproduction device outputs a sound signal like the target device would do.

These audio signals AS are used to feed the respective device (cf. soundbar 12) as it is illustrated by the step 130. As response to the audio signal AS, the soundbar outputs a sound (cf. step 140). This step 140 represents the last of the simulation of the target device.

In order to enable that the method 100 is a generic method, the method may further comprise step 115 for selecting the processing parameter PP dependent on the target device to be simulated. The step is arranged in parallel to the step 110, such that the correct processing parameters PP can be used within the step 120.

With respect to FIG. 1 and FIG. 2*a* to 2*c*, it should be noted that here, the reproduction device 12 (soundbar) has been discussed as being a soundbar just having transducers at the front side. According to further embodiments, there might also be transducers arranged at different sides, e.g. at the sides, the top plate or the backside, or at the bottom.

According to embodiments, the inventive soundbar can either playback signals based on professional, uncompressed signals, and at the same time different audio coding methods/different audio codecs (encoder and/or decoder) can be included, such that the professional user can select those and adjust their parameters (e.g. bitrate), to check the performance of differently coded version of the content when listening over a soundbar device.

Below, further embodiments will be discussed. The first embodiment provides an audio reproduction device which can simulate other audio reproduction devices. This audio reproduction device may, for example, be formed by the soundbar 12 and comprises the processor 14. Expressed from another point of view, this means that according to embodiments, the audio reproduction device is of a soundbar type. Alternatively, the audio reproduction device may be of a loudspeaker type or may be formed by a loudspeaker system featuring multiple transducers or a loudspeaker system having one or more loudspeaker types or transducer types. Thus, the core idea is to build a device that has high quality components, features a bunch of different connectors, and features digital signal processing. With such a device, it is possible to mimic/simulate what other soundbar systems or loudspeaker systems would do.

According to an embodiment, the device may be configured, such that by use of the processing parameters, the number of actually used drivers is selectable.

According to further embodiments, the processor can process an input signal having at least one channel, where processing is applied to generate the spatial sound reproduction from the device. According to further embodiments, the processor can process an input signal having at least one channel, wherein processing is applied to simulate the performance and/or processing of other devices. According to a further embodiment, the processor can use dipole processing to generate a spatial sound impression. According to a further embodiment, the processor can use beam forming to generate the spatial sound impression. According to a further embodiment, the processor can use psychoacoustic processing to generate a spatial sound impression.

According to a further embodiment, the processor is configured to feature different audio compression codecs that can be selected and adjusted by the user. It should be noted that the processor can, for example, receive the audio signal as uncompressed or compressed audio signal or extract the audio signal out of a video stream. Thus, the processor features video input. It should be noted that the processor may have a plurality of inputs to receive signals having a different type (various connectors (consumer and professional)).

Another processing parameter may describe the directivity (directivity pattern) of a sound reproduced by a target system. The directivity typically depends on the exact position of the different transducer types within the target device and varies over the frequency. Often the directivity varies horizontally and vertically. Such directivity effects may be simulated by a high quality reproduction/simulation system/device, e.g., the reproduction device may uses an array to perform beamforming or other array processing for the different frequency ranges to simulate a directivity behavior of a target system.

Another embodiment provides the method for analyzing one or more target devices in order to obtain the processing parameters describing the sound characteristic of the target device. Here, the method may comprise the step of reproducing a set of single or multi-channel test tones and sequences including e.g. sweeps over the different channels and sweeping over the different frequency ranges in order to generate an information on the entire processing. This method may be performed by a hardware device, which, for example, comprises a sound source for the different channels and a microphone array for receiving the response of the reproduction of the test tone produced in different directions.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded audio signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A sound reproduction/simulation system, comprising:

at least one sound reproduction device driven by one or more audio signals; and a processor for processing an input audio stream to generate the one or more audio signals, wherein the processor is configured to perform the processing by use of first or second processing parameters defining a sound characteristic of a first target sound system or a second target sound system from at least two different target sound systems, wherein the first processing parameters are different from the second processing parameters;

wherein the sound reproduction/simulation system further comprises a memory having stored thereon a database or the sound reproduction/simulation system is connected to the database, wherein the database stores the first processing parameters for the first target sound system and the second processing parameters for the second target sound system, wherein the first target sound system and the second target sound system are soundbars configured to reproduce surround, 3D content, and/or immersive content;

wherein said first processing parameters are configured to enable to mimic and/or simulate the first target sound system by use of the at least one sound reproduction device and wherein the second processing parameters are configured to enable to mimic and/or simulate the second target sound system by use of the at least one sound reproduction device; and wherein a processing parameter of the first processing parameters describes a directivity of a sound produced by the first target sound system.

2. The sound reproduction/simulation system according to claim 1, wherein the at least one sound reproduction device comprises at least two transducers or more than two transducers.

3. The sound reproduction/simulation system according to claim 1, wherein the sound reproduction/simulation system is configured to reproduce at least two channels or more than two channels.

4. The sound reproduction/simulation system according to claim 1, wherein the first target sound system comprises the soundbar with one or more transducers.

5. The sound reproduction/simulation system according to claim 1, wherein at least one processing parameter of the first processing parameters describes a transducer configuration of the first target sound system of the sound characteristic.

6. The sound reproduction/simulation system according to claim 5, wherein the transducer configuration comprises information regarding a number of separated channels and/or regarding a number of transducers per channel or for different channels and/or comprises information regarding a number of transducers of the first target sound system.

7. The sound reproduction/simulation system according to claim 1, wherein a number and/or a selection of used transducers of the at least one sound reproduction device is dependent on the processing parameter of the first processing parameters and/or dependent on a transducer configuration.

8. The sound reproduction/simulation system according to claim 1, wherein the processing parameter of the first processing parameters describes a transducer frequency response, a transducer impulse response or a transducer phase response of transducers of the first target sound system as the sound characteristic; or wherein the processing parameter of the first processing parameters describes the transducer frequency response, the transducer impulse response or the transducer phase response of the transducers of the first target sound system as the sound characteristic and wherein the one or more audio signals are processed and/or filtered so as to simulate the transducer frequency response and/or transducer impulse response and/or transducer phase response.

9. The sound reproduction/simulation system according to claim 1, wherein the processing parameter of the first processing parameters describes an enclosure performance of the first target sound system as the sound characteristic.

10. The sound reproduction/simulation system according to claim 1, wherein at least the processing parameter of the first processing parameters describes a digital processing of the first target sound system and/or a content encoding format as the sound characteristic; or wherein at least the processing parameter of the first processing parameters describes a digital processing coding of the first target sound system and/or a content encoding format as a sound characteristic and wherein the processing performs the same digital processing and/or digital en-/decoding as the first target sound system for outputting the one or more audio signals.

11. The sound reproduction/simulation system according to claim 1, wherein at least the processing parameter of the first processing parameters describe an operation mode of the first target sound system and/or upmixing/downmixing mode as the sound characteristic.

12. The sound reproduction/simulation system according to claim 1, wherein at least the processing parameter of the first processing parameters describes a directivity of the first target sound system as the sound characteristic.

13. The sound reproduction/simulation system according to claim 1, wherein the sound reproduction/simulation system further comprises an input for receiving the input audio stream; and/or wherein the input audio stream is a one-channel audio stream; and/or wherein the sound reproduction/simulation system comprises a video input for receiving the input audio stream.

14. A system comprising the sound reproduction/simulation system according to claim 1 and an apparatus for determining one or more first processing parameters comprising an analyzer configured to analyze the first target sound system in order to acquire the one or more first processing parameters, wherein the analysis is performed with respect to at least two properties.

15. A method for simulating a performance of a first target sound system and a second target sound system, the method comprising:

obtaining first processing parameters or second processing parameters for the first target sound system or the second target sound system from a memory, wherein the first processing parameters for the first target sound system are from at least two different target sound systems and the second processing parameters for the second target sound system are from the at least two different target sound systems, wherein the first processing parameters are different from the second processing parameters, and wherein the first target sound system and the second target sound system are soundbars configured to reproduce surround, 3D content, and/or immersive content;

wherein the first processing parameters are configured to enable to mimic and/or simulate the first target sound system by use of at least one sound reproduction device and wherein the second processing parameters are configured to enable to mimic and/or simulate the second target sound system by use of the at least one sound reproduction device;

processing an input audio stream to generate one or more audio signals, wherein the processing is performed by use of the first processing parameters or the second processing parameters defining a sound characteristic of the first target sound system or the second target sound system from at least two different target sound systems, wherein a processing parameter of the first processing parameters describes a directivity of a sound reproduced by the first target sound system; and outputting the one or more audio signals in order to drive the at least one sound reproduction device.

16. The method according to claim 15, the method further comprising:

analyzing the first target sound system in order to acquire one or more first processing parameters, wherein the analysis is performed with respect to at least two dimensions.

17. A non-transitory digital storage medium having a computer program stored thereon to perform a method for simulating a performance of a first target sound system and a second target sound system, the method comprising:

obtaining first processing parameters or second processing parameters for the first target sound system or the second target sound system from a memory, wherein the first processing parameters for the first target sound system are from at least two different target sound systems and the second processing parameters for the second target sound system are from the at least two different target sound systems, wherein the first processing parameters are different from the second processing parameters, and wherein the first target sound system and the second target sound system are soundbars configured to reproduce surround, 3D content, and/or immersive content, wherein the first processing parameters are configured to enable to mimic and/or simulate the first target sound system by use of at least one sound reproduction device and wherein the second processing parameters are configured to enable to mimic and/or simulate the second target sound system by use of the at least one sound reproduction device;

processing an input audio stream to generate one or more audio signals, wherein the processing is performed by use of the first processing parameters or the second processing parameters defining a sound characteristic of the first target sound system or the second target sound system from the at least two different target sound systems, and wherein a processing parameter of the first processing parameters describes a directivity of a sound reproduced by the first target sound system; and outputting the one or more audio signals in order to drive the at least one sound reproduction device, when said computer program is run by a computer.

18. The sound reproduction/simulation system according to claim 1, wherein the first processing parameters or the second processing parameters describe an operation mode, and wherein the operation mode is one of dipoling, beamforming, and audio playback.

* * * * *